United States Patent [19]
McGann et al.

[11] 3,874,587
[45] Apr. 1, 1975

[54] MECHANICAL COUNTER SYSTEM FOR ALTIMETRIC DISPLAYS

[75] Inventors: Harold J. McGann, Phoenix; John F. Whalen; Boyd K. Williams, both of Scottsdale, all of Ariz.

[73] Assignee: Sperry Rand Corporation, New York, N.Y.

[22] Filed: May 6, 1974

[21] Appl. No.: 467,050

[52] U.S. Cl............ 235/131 R, 235/1 C, 235/139 R
[51] Int. Cl........................ G06c 25/00, G06c 9/00
[58] Field of Search..... 235/131 R, 131 FD, 131 M, 235/131 JA, 1 C, 103, 91 R, 135, 137, 138, 139 R

[56] References Cited
UNITED STATES PATENTS

| | | | |
|---|---|---|---|
| 2,173,773 | 9/1939 | Aamot et al. | 235/1 C |
| 2,342,325 | 2/1944 | Bliss | 235/1 C |
| 2,382,708 | 8/1945 | Graydon, Jr. et al. | 235/131 R |
| 3,065,909 | 11/1962 | Herr | 235/139 R |
| 3,337,129 | 8/1967 | Johnson | 235/139 R |

Primary Examiner—Stephen J. Tomsky
Attorney, Agent, or Firm—Howard P. Terry

[57] ABSTRACT

An intermittent motion transfer device for precise bi-directional transfer and alignment of the successive drums of a mechanical counter in response to the position of a movable input shaft employs an intermittently operative gear driving and position locking system cooperating with a system of confined resilient bands operating ball detents.

14 Claims, 8 Drawing Figures

MECHANICAL COUNTER SYSTEM FOR ALTIMETRIC DISPLAYS

BACKGROUND OF THE INVENTION

1. Field of the Invention

The invention pertains to a mechanical counter system for application in sensitive instruments such as altimeters and more particularly relates to an improved mechanical counter or register including a precision drum motion transfer device for accurate bidirectional transfer and alignment of cooperating read-out drums without substantial input torque increase whenever a drum is repositioned.

2. Description of the Prior Art

Generally, prior art mechanical drum counter and register devices require precise alignment of read out drum elements and thus require parts machined so accurately as to be excessively expensive. Mechanical counters of alternative designs depend upon the use of conventional spring controlled detent mechanisms, but such detents impose a high input torque anamaly just as the read out drum elements are being repositioned, since the input driver must evidently overcome significant resisting detent forces.

SUMMARY OF THE INVENTION

The present invention overcomes the problems associated with prior art mechanical counter display systems through the use of minimum precision drum transfer devices for accurate bidirectional motion transfer and yet provides precision alignment of cooperating numerical display drums without substantial input torque increase whenever a drum is repositioned. The counter elements may be fabricated without high precision machining tolerances and the elements may, in fact, be formed by molding processes. Transfer and alignment of successive display drums in response to a movable input shaft employs an intermittent gear driving and drum position locking mechanism cooperating with novel confined resilient metal bands for operating ball detents.

DESCRIPTION OF THE PREFERRED EMBODIMENTS

Figure 1:
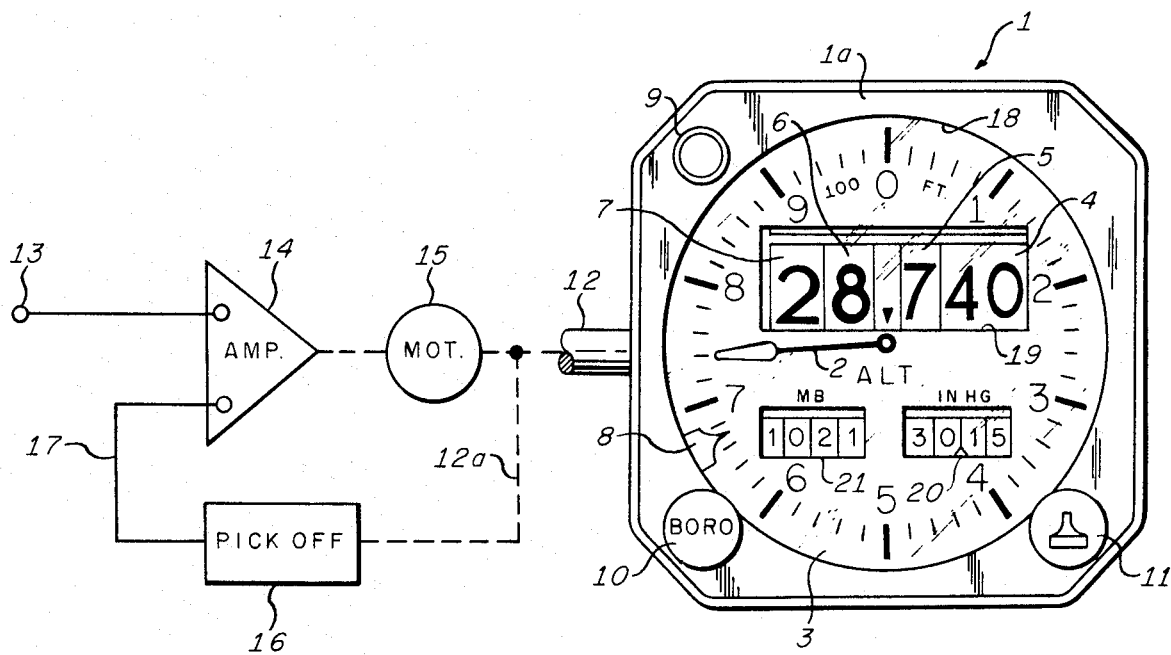
FIG. 1 is a face view of an altimetric display employing the invention and showing a typical servo for supplying positioning torque signals.

The invention finds application, for example, in counters and in numerical displays such as illustrated in use in an aircraft altimeter display system in FIG. 1, though it may be used in other decimal counter and register or mechanical storage devices. In the typical application of FIG. 1, the altitude display 1 includes a housing 1a through a frontal window 18 of which altitude data may be viewed. In many modern cases, such altimeter displays are remotely operated by electrical signals proportional to altitude, generated, for example, by a conventional radio or barometric altitude sensor (not shown), and applied to input terminal 13. After amplification, if required, by servo amplifier 14, the altitude signal is used to drive a servo motor 15 and therefore to position a mechanical shaft 12 of display 1. The position of shaft 12 may be fed back to an appropriately driven shaft 12a to provide from pick off 16 electrical position feed back signals to an input of servo amplifier 14, thereby closing the positioning servo loop.

Altimeter 1 may include in the conventional manner a rotating fine altitude pointer 2 cooperating with a calibrated dial 3 and also with a digital coarse altitude display in rectangular window 19 for showing altitude to tens of thousands of feet, as by the axially aligned mechanical counter drums 4, 5, 6, and 7. If the shaft 12 is positioned according to the output of a pressure sensing altimeter, the usual barometric pressure correction may be adjusted, for example, by manual operation of control knob 10, the human pilot turning knob 10 until actual barometric pressure in inches of mercury is read on the barometric pressure display counter 20, while the counter 21 adjacent counter 20 serves to display the set barometric pressure value in millibars as is sometimes required. Automatic compensation of the altitude read out may then be achieved in the conventional manner. Manually controllable knob 11 may be provided for the purpose of setting the altitude reminder pointer or bug 8 while annunciator 9 is normally provided as part of an altitude alert system.

The invention will be described in connection with the digital display in window 19 as provided by the axially aligned counter drums 4, 5, 6, and 7, one of which is driven directly or indirectly by shaft 12, and that other elements of FIG. 1 are generally conventional and do not necessarily represent prime parts of the present invention.

Figures 2, 3:
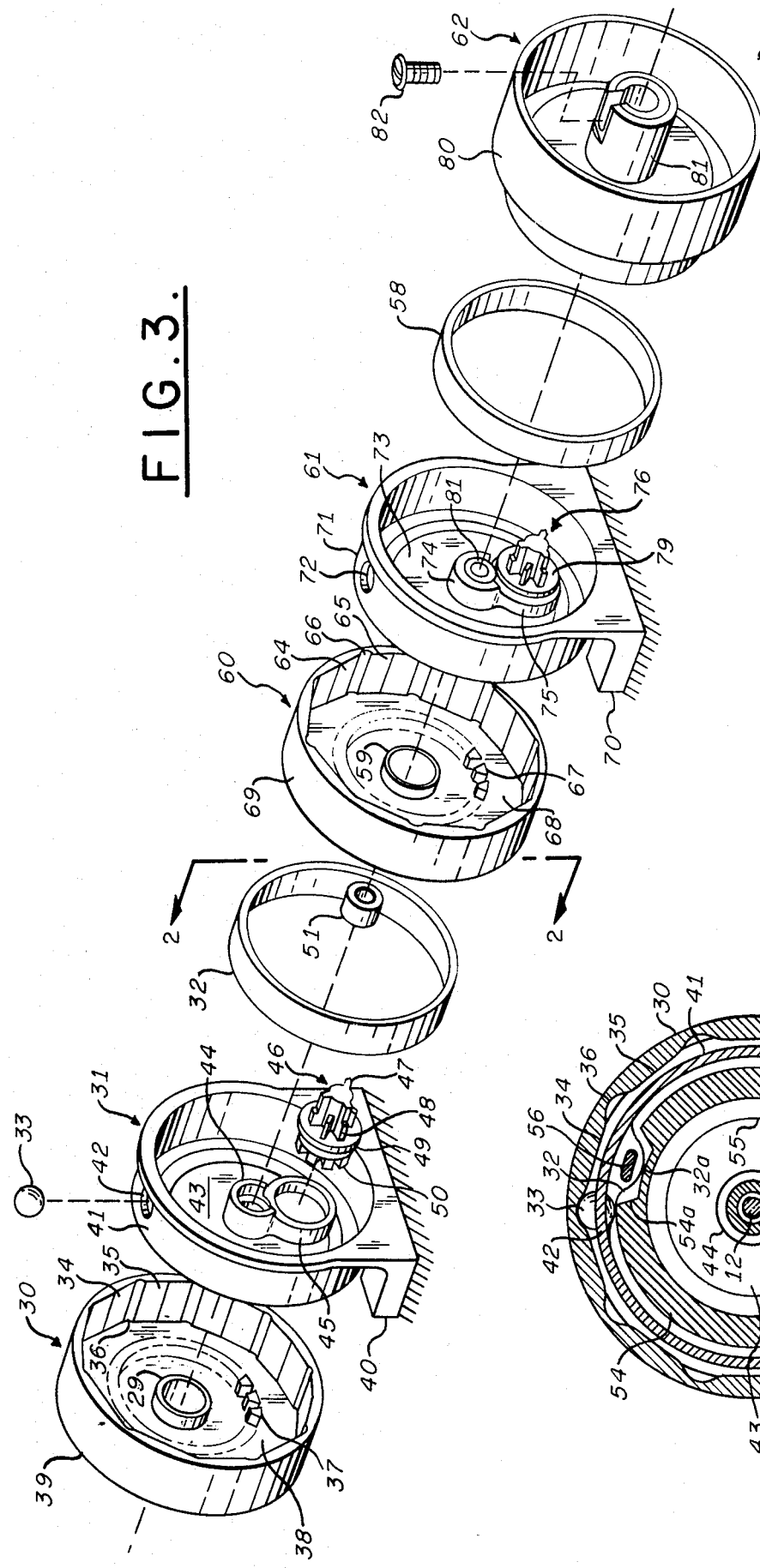
FIG. 2 is a lateral cross section view of a typical counter drum module embodying the invention.
FIG. 3 is an exploded view showing parts of the invention used in cooperating modules.
Figure 8:
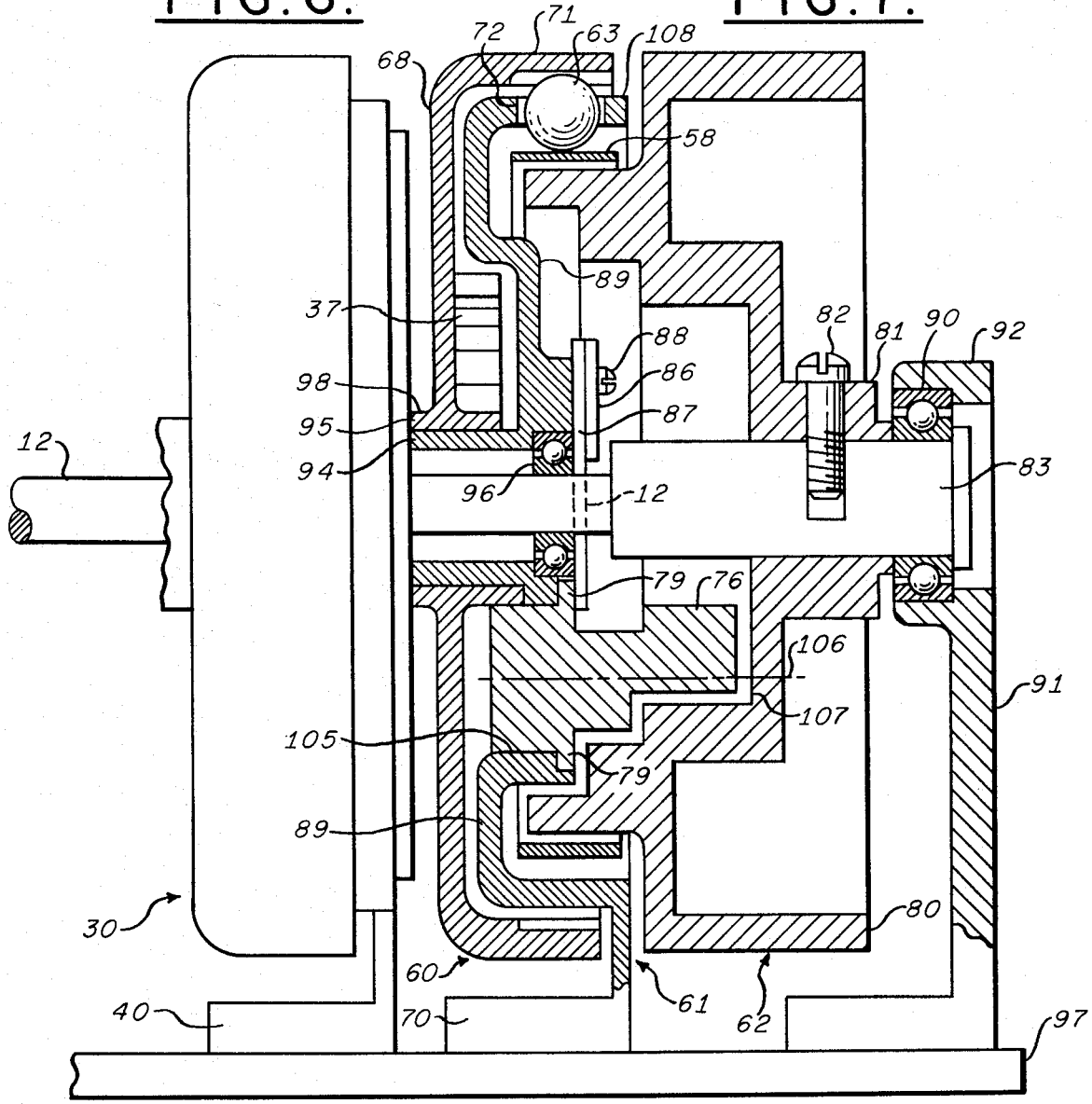
FIG. 8 is a longitudinal view, partly in cross section of the counter of the present invention.

FIGS. 2, 3, and 8 provide principal illustrations by means of which a general understanding of the invention may be derived. From these figures, it will be appreciated that the counter system comprises a configuration of axially aligned and rotatable drum-like display elements supported on a principal shaft 12 and its shaft extension 83 with respect to fixed casing elements such as elements 31, 61, and 91. The elements 31 and 61 include respective bases 40 and 70 affixed to a base plate 97 (FIGS. 2 and 8) by suitable fasteners such as screws 98 and 99. Referring to FIGS. 2 and 3, the highest order decade drum 30 includes an annular display-carrying flange 30 which cooperates directly with the fixed support casing element 31, a rotatable resilient band 32, ball 33, bearing 51, and the intermittent or transfer gearing 46. It will be evident to those skilled in the counter art that any plurality of similar modular configurations may be supported in cooperative aligned fashion along input shaft 12–83. In general, shaft extension 83 provides the mechanical input to the system, it being fixed by set screw 82 in sleeve 81 for rotation of the lowest order display carrying drum 62. In operation, the lowest order drum 62, which may serve as a unit decade display drum, may be driven directly by shaft 12–83, and will rotate from its zero position approximately nine tenths of 1 revolution with no effect upon the adjacent medium order display drum 60 (or tens drum). Then, as in decade counter systems driven by conventional Geneva mechanisms, for approximately one tenth revolution of the lowest order drum 62, the tens display drum 60 rotates or advances precisely one tenth of a revolution. In turn, the highest order drum 31 (or hundreds drum) will be stationary for nine tenths of a revolution of the tens order drum 60 and is finally rotated or advanced one tenth of a revolution during approximately one tenth revolution of the tens order drum 60.

It will thus be understood that the structure and operation of the invention may be illustrated by considering further the highest order drum module associated with casing element 31 (FIGS. 2 and 3). Casing element 31, is preferably a casting or molding including a central sleeve or hub 44 supported on an end wall 43 which accommodates a sleeve bearing 51 (which may be a ball bearing, if desired) for supporting drive shaft 12. Radially offset from sleeve 44 is a second sleeve or hub 45, also supported on end wall 43 and aligned parallel to sleeve 44, for accommodating a specially configured intermittent gear system 46. For reasons yet to be explained, the special gear system 46, which may also be an economical plastic molding, is free to rotate within sleeve 45, being axially confined therein by an annular flange 49 cooperating with the outer face of sleeve 45 and by the flat end wall 68 of the next adjacent or medium order annular drum 60. The casing element 31 also includes a peripheral annular flange 41 and has formed thereon a small radially extending circular clearance hole 42 for confining or guiding a preferably metallic ball 33 forming a part of the dent mechanism to be described. Annular drum 30, casing element 31, and intermittent gearing system 46 may be light-weight metal castings or may readily be formed of a suitable thermoplastic polyester material as mentioned.

Figure 5:
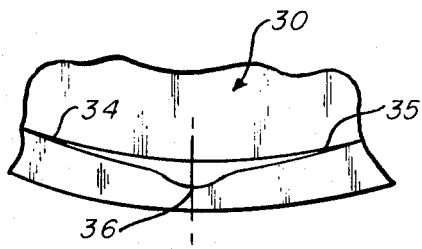
FIG. 5 is a view of a detent arrangement used in the apparatus of FIGS. 2 and 3.

Generally surrounding or overlapping casing element 31 is the display drum 30 supported by an extension of sleeve 44 beyond wall 43 for rotation on the external surface of sleeve 44. End wall 38 of drum 30 has formed thereon a concentric ring of teeth 37 forming an internal gear. Gear teeth 37 mesh with output gear teeth 50 of the intermittent gear system 46 so that drum 30 is advanced one tenth of a revolution whenever gear system 46 is rotated a predetermined number of degrees, for example, 120° depending on the selected gear ratio. The interior surface of the display-carrying flange 39 of drum 30 has formed thereon an integral number of sets of oppositely inclined planes, such as the inclined planes 34 and 35 of FIGS. 2 and 3 and shown detail in FIG. 5, the cooperating planes of each set being symmetrically separated at their apices by a deepened partly-circular or rounded groove 36. Each such slot or groove 36 acts as a precision aligning detent for the metal ball 33, as will be described.

In accordance with the teachings of the present invention, a thin continuous resilient metal band 32 of, for example, a suitable nickel alloy, having a relaxed diameter of the internal surface of flange 41 of casing 31, is compressed, in assembly, to lie on that surface with the result that a loop or wave 32a is formed in the band, the function of which will be described. In FIGS. 2 and 8, flexible band 32, when in the position shown, urges ball 33, constrained within hole 42, radially outwardly into one of the grooves 36, thereby preventing rotation of drum 30 with respect to casing element 31 and assuring precision alignment with the adjacent drum.

It is well recognized that in the normal operation of the display drum of a conventional counter, there are times at which detent constraints against turning must be overcome so that the drum is permitted to advance to the next detent position. In the present invention, the flexible band actuated ball detent mechanism reduces these constraints almost to zero, thereby reducing the torque requirements to servo 15. Several elements seen in FIG. 2 are formed integrally on the back of the end wall 68 of the next adjacent or medium order drum 60 casting, as shown in detail in FIG. 4. One of these elements is an annular ring or guide flange means 54 for controlling the resilient band 32. At 54a, guide 54 has formed therein an indentation for accommodating the loop or wave 32a formed in band 32. The other element formed on wall 68 is a ball stop and guide finger 56 centrally located in indentation 54a for limiting movement of ball 33 in opening 42 and for further determining or assuring the location of loop 32a. Because of the size and spring constant of band 32, it firmly engages the inner surface of flange 41 and does not tend to slide or rotate relative thereto although such sliding would in no way affect the operation of the counter. However, since the loop or wave 32a will form only within the indentation 54a, rotation of drum 60 also rotates the loop 32a and advances it progressively around shaft 12. Finger 56 assures such loop rotation.

Figure 4:
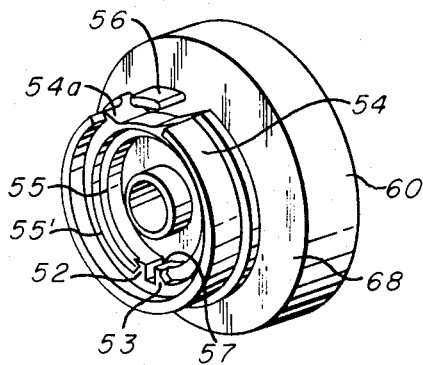
FIG. 4 is a face view of transfer gear teeth used in the module of FIG. 2.

Further elements of the counter of the present invention control the transfer gear system 46; these are also shown in detail in FIG. 4 and are located coaxially with shaft 12 on the side of wall 68 of drum 60 facing casing element 31. At a point diametrically opposite indentation 54a, an axially extending slot is formed in the shoulder 55. The outer edge of shoulder 55 is relieved, as at 55', throughout its entire circumference except adjacent slot 57 where portions of shoulder 55 are left thereby to form a pair of gear-like teeth 52 and 53.

Figure 6:
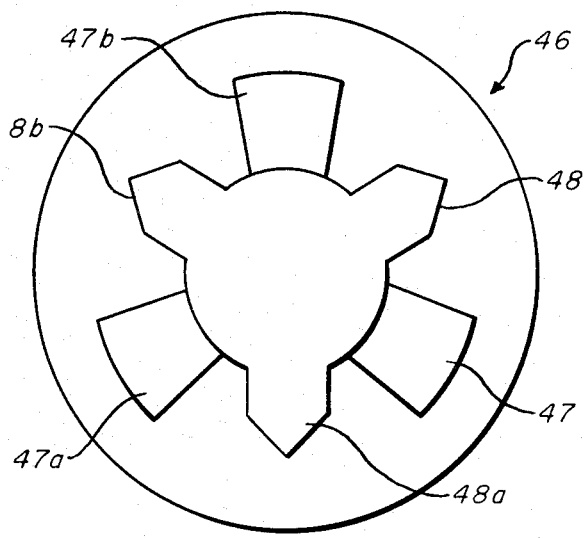
FIGS. 6 and 7 illustrate face views of a special intermittent action gearing system used in the apparatus of FIGS. 2 and 3.
Figure 7:
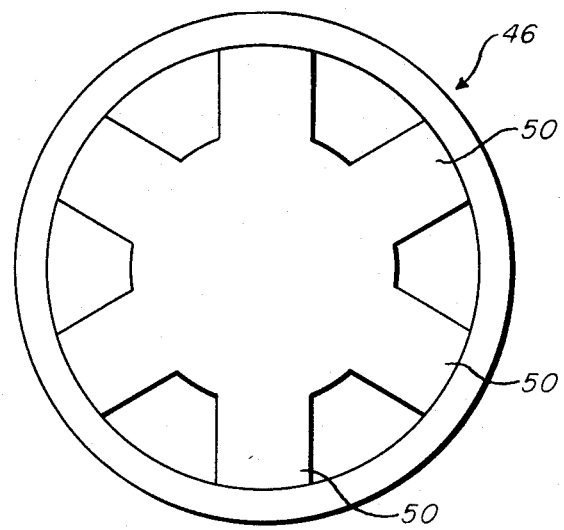

The tooth arrangement of transfer gear 46 is shown in more detail in FIGS. 6 and 7, the former showing the teeth which cooperate with slot 57, teeth 52 and 53, and shoulder 55 and the latter figure showing the teeth which cooperate with teeth 37 on internal face of wall 38 of drum 30. In the embodiment of the invention illustrated, the former set of gear teeth on transfer gear 46 generally comprise six teeth 47a, 47b, 47c, and 48a, 48b, 48c. Teeth 47a, 47b, 47c extend only about one-half the tooth face and have an outwardly expanding profile which in operation cooperate with the shape of teeth 52 and 53 (FIG. 2) to provide the proper rotational velocity of the gear cluster 46. Teeth 48a, 48b, 48c extend the full tooth face and have tapered outer edges as shown which in operation fall into slot 57 and are driven by the slot faces.

In operation, the arrival of the transfer tooth pair 52, 53 at generally the position shown in FIG. 2 permits tooth 53 to contact one of the teeth 47, thereby rotating the 60. 46. Prior to this event, adjacent faces of teeth 48 such as the faces of teeth 48 and 48a have been in sliding engagement with the inner face of the annular shoulder 55 serving to detent the transfer gear against rotation. Upon rotation of gear 46, tooth 48a falls into slot 57. As drum 60 continues to advance, the transfer gear 46 is rotated until the next adjacent face of teeth 48, i.e., 48a and 48b, now contact the inner surface of shoulder 55 and again locks the transfer gear 46 until the next full revolution of drum 60 is completed. During the transfer interval, as previously noted, the indentation 54a has rotated under ball 33 and the flex band loop has correspondingly been rotated to a position under ball 33, thereby allowing it to go through hole 42 onto stop finger and guide 56 so that display drum 30 is allowed to be driven forward through gear teeth 37 and 50 one angular increment, the inclined planes 34, 35, et cetera, serving to assure that the ball 33 will be advanced through hole 42. In accordance with the invention, the resisting force of the detent is substantially zero, since the ball is not physically forced out of its detents position. If the counter is oriented so that ball 33 must be raised, the force encountered is only that required to lift the weight of the ball by operation of the inclined planes 34, 35.

Accordingly, it is seen that a mechanical counter and counter detent mechanism is provided according to the invention which brings about very precise alignment of the counter drums or display elements as the input changes while not requiring high precision machining of the transfer mechanism and at the same time maintaining a substantially constant driving torque requirement. Its operation depends upon the fact that the continuous resilient metal band 32 is placed on the inside of the cylindrical surface of the fixed flange or sleeve 41, the band having a slightly larger circumference than that of the inner cylindrical surface so that a working wave or loop 32a is formed. The metal band 32 is inherently constrained so that it exerts an outward radial force at all points of the flange 41 except at the location 32a of the wave where it is not in contact with anything. The wave 32a is driven around the inner surface of cylindrical sleeve 41 by indentation 54a and finger 56. Thus, in each successive position of the wave or loop 32a as indentation 55 rotates, the normal outward force on ball 33 is simply eliminated for a short time interval, resulting in substantially no change in the effective input drive torque on shaft 12. It will be noted that the foregoing operation is completely reversible since the transfer mechanism is symmetrical.

Continued rotation of transfer gear system 46 rotates high order drum 30 through its one tenth revolution and eventually the wave loop 32a passes the detent ball 33 and its trailing edge drives ball 33 into the next adjacent detent groove 36 thereby precisely locking the high order drum 30 in its new fixed position with respect to base plate 97. The teeth 48a and 48b of gear 46 again ride on the inner surface of cylindrical shoulder 55, preventing further motion of gear system 46. Completion of this process constitutes one counter transfer (36° motion of drum 30 in a decade counter), after which the drum 30 is ready for the next count.

FIGS. 3 and 8 are of further aid in understanding that the modular counter element so far described may be operated in cooperation with similar modular counter elements so that any desired number of digits may be displayed in a stacked array. Thus, as previously mentioned in connection with FIGS. 3 and 8, the low order drum 62 may be directly driven by the extension 83 of shaft 12, being fixed to extension 83 by set screw 82. Shaft extension 83 may be journaled for rotation in a ball bearing race 90 held between clamp 92 and support element 91 at a predetermined distance from base plate 97.

The lower order drum 62 produces retardation or advancement of the medium order drum 60, while the medium order drum 60 produces its particular retardation or advancement of the higher order drum 30, just as generally described in connection with FIGS. 3 and 8. Similarly, a highest order drum may be intermittently retarded or advanced, et cetera. The modules associated with casing element 89 of FIG. 8, which casing element 89 carries the medium order drum 60, is similar to the previously described module associated with casing element 31 carrying high order drum 30. In the casing element 89 of FIGS. 3 and 8, the central sleeve 94 projecting through casing element 89 accommodates an axially located ball bearing device 96 mounted on shaft 12. A bifurcated strip element 87 held in position by retainer clamp 86 and the screw 88 affixed to disc 89 extends downwardly around shaft 12 and past the flange 79 on transfer gear 76, and serves to retain the gear in position within sleeve 105. Radially offset from sleeve 94 is the second sleeve 105, projecting through the wall of casing element 89, aligned parallel to sleeve 94, and having an opening for accommodating transfer gear system 76 identical to transfer gear system 46. The gear system 76 may be rotated about its axis 106 within sleeve 105, being axially confined therein by its annular flange 79 contacting the outer face of sleeve 105, by the inner face 107 of the low order, annular drum dial 62, and by retainer strip 87. The peripheral annular flange 108 affixed to casing element 89 is equipped with a circular clearance hole 72 for confining a hardened metal detent ball 63 analogous to ball 33.

Generally surrounding casing element 89 is the medium order annular drum 71 supported by sleeve 93 for rotation around intersurface 95 as sleeve 94 and for consequent rotation of the next higher order module drum 30. Like disc 38 of drum 30, disc 68 of drum 60 supports a concentric ring of teeth (not seen in FIG. 8) forming an internal gear. These internal gear teeth continuously mesh with the output gear teeth of the special intermittent gear system 76 so that drum 71 is advanced one tenth of a revolution whenever special gear system 46 is appropriately rotated.

The interior surface of annular flange 71 of drum 60 is, like drum 30, equipped with sets of oppositely inclined planes such as planes 64 and 65, the cooperating planes of each set being symmetrically separated by a rounded groove 66, each such groove 66 acting as a detenting slot for hardened detent ball 63. It will be understood that a continuous resilient band 58 is again supplied to urge ball 63 into one of the rounded grooves 66 when detent action is required, drum 60 being fixed with respect to casing element 89 during such detent action. It will be appreciated that each successive module of the display system operates in a manner similar to that of the first described module, each module being generally similar in structure. While display numerals have not been drawn on the cylindrical surfaces of the several display drums 30, 60, 80, 100 merely for the sake of maintaining simplicity of the drawings, it will be understood that suitable decimal, angular, or time indicating numbers may be applied thereto in an entirely conventional manner, as by silk screening or other conventional processes, and that these may be viewed through a suitable window 19.

It is seen that the invention overcomes problems associated with prior art mechanical counter or register devices by the use of a non-precision drum motion transfer system for determining bidirectional motion and a flexible band-detent ball mechanism for precision alignment of the respective drums of a mechanical counter display or other similar system. The detent mechanism reduces detent breaking input torque to substantially zero.

While the invention has been described in its preferred embodiments, it is to be understood that the words which have been used are words of description rather than of limitation and that changes within the purview of the appended claims may be made without departing from the true scope and spirit of the invention in its broader aspects.

We claim:

1. Numerical display means for displaying symbols representative of the rotational position of shaft means comprising:

casing element means having journal means for supporting said shaft for rotation therein, first drum display means mounted for rotation with respect to said casing element means on said shaft means, second drum display means mounted for rotation with respect to said casing element means on said shaft means, said casing element means having first annular flange means adjacent the periphery thereof, said first drum display means having second annular flange means adjacent the periphery thereof and projecting under said first annular flange means, said second drum display means having third annular flange means adjacent the periphery thereof and projecting over said first annular flange means, flexible band means disposed in the region between said first and second annular flange means, and detent means responsive to flexing of said flexible band means for selectively and fixedly engaging said first and third annular flange means against relative rotation about said shaft means.

2. Apparatus as described in claim 1 wherein the periphery of said flexible band means is greater than the inner circumference of said first annular flange means for forming loop means in said flexible band means.

3. Apparatus as described in claim 2 including guide means integral with said second annular flange means for angularly positioning said loop means.

4. Apparatus as described in claim 3 including intermittently operative means responsive to the position of said first drum display means for driving said second drum display means to a predetermined location relative to said first drum display means.

5. Apparatus as described in claim 4 wherein said intermittently operative means is journaled within said casing element means for intermittent rotation with respect thereto and for intermittent rotation of said second drum display means.

6. Apparatus as described in claim 1 wherein said detent means includes a plurality of substantially regularly spaced detent indentations on the inner circumferential surface of said second drum display means.

7. Apparatus as described in claim 6 wherein said detent means comprises ball means movable through an opening in said first annular flange means for selectively engaging said regularly spaced indentations, said ball means being responsive to flexing of said flexible band means.

8. Apparatus as described in claim 3 wherein said guide means integral with said second annular flange means includes guiding indentation means cooperating with guide finger means oppositely disposed relative to said loop means.

9. Apparatus as described in claim 8 including detent means responsive to said loop means for selectively engaging and disengaging said second drum display means.

10. Apparatus as described in claim 5 wherein said intermittently operative means includes gear means operative once for each complete revolution of said first drum display means.

11. Apparatus as described in claim 10 wherein said intermittently operative means includes means for locking said intermittently operative means except when responding to said gear means.

12. Apparatus as described in claim 11 including third drum display means intermittently responsive to said second drum display means.

13. Apparatus as described in claim 6 wherein each said detent indentation includes oppositely tilted inclined planes with a rounded groove therebetween for cooperating directly with said first and third drum display means.

14. Apparatus as described in claim 7 wherein guide finger means limits the motion of said detent ball means through said opening.

\* \* \* \* \*